July 22, 1969 W. WEIDENBACH 3,456,894
MULTIPART FILM TAKE-UP SPOOL FOR A CAMERA
Filed Oct. 9, 1967
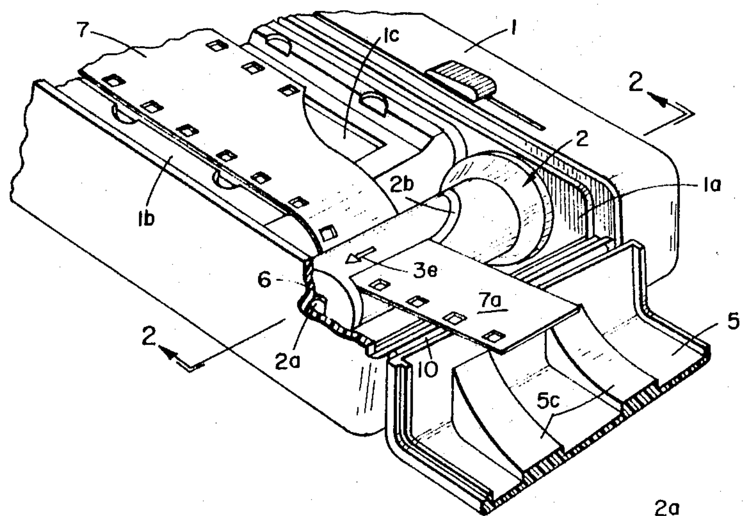
FIG. 1
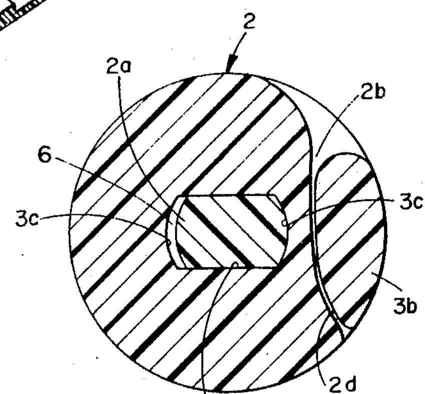
FIG. 3
FIG. 2
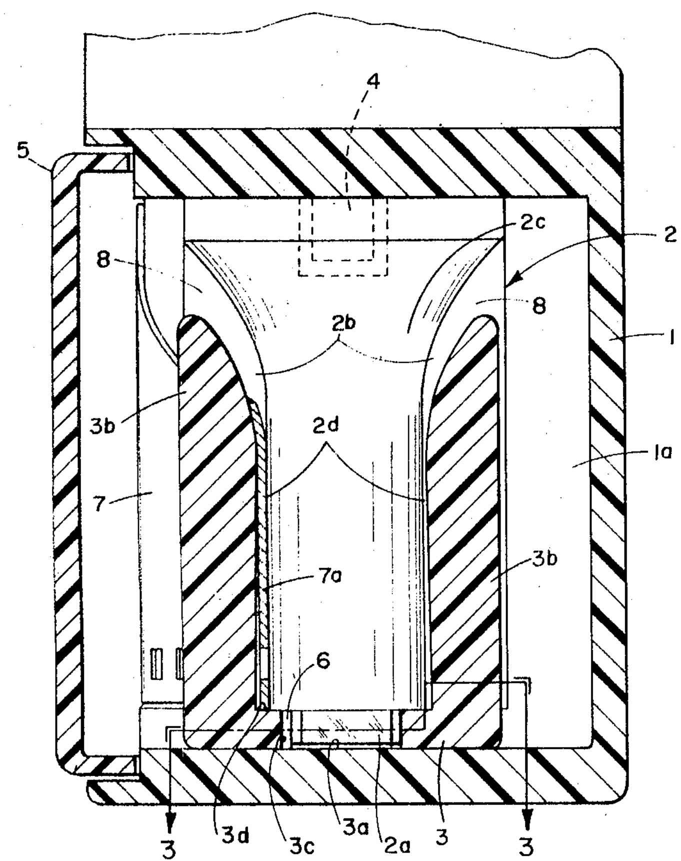
WILLY WEIDENBACH
*INVENTOR.*
BY Ronald S Karchen
Robert W Hampton
ATTORNEYS United States Patent Office 3,456,894 Patented July 22, 1969

3,456,894

MULTIPART FILM TAKE-UP SPOOL FOR A CAMERA

Willy Weidenbach, Stuttgart-Wangen, Germany, assignor to Eastman Kodak Company, Rochester, N.Y., a corporation of New Jersey Filed Oct. 9, 1967, Ser. No. 673,794
Claims priority, application Germany, Feb. 11, 1967, K 61,403
Int. Cl. B65h 75/28
U.S. Cl. 242—74.1 4 Claims

ABSTRACT OF THE DISCLOSURE

A quick-loading multipart film take-up spool for apparatus such as a camera comprising a rotatable core and a clamping portion overlying the core, the clamping portion having a plurality of resilient jaws to engage the leader end of a roll of film between a jaw and the core and being mounted on the core with a key and slot arrangement having lateral tolerance for limited displacement of the clamping portion that enables both quick and secure loading of the leader end.

Reference is made to the following commonly assigned copending applications: U.S. application Ser. No. 505,-298, Photographic Camera, filed Aug. 27, 1965 in the names of Ernst Lieser et al.; and U.S. application Ser. No. 577,102, Photographic Camera, filed Sept. 2, 1966, in the names of Ernst Lieser et al.

BACKGROUND OF THE INVENTION

Field of the invention

The invention relates to a take-up spool and more particularly to a multipart take-up spool for a photographic or cinematographic camera to which the leader of a film supply readily may be attached for winding of the film on the spool.

Description of the prior art

Quick loading film spools for apparatus such as cameras are known. For example, in copending applications Ser. No. 505,298, filed Aug. 27, 1965, entitled, Photographic Camera, and Ser. No. 577,102, filed Sept. 2, 1966, entitled, Photographic Camera, there are described roll film take-up spools having slots in which the leading end of a roll film may be secured. In one case the slot is formed by a groove which is slightly inclined toward the axis of the spool core and which separates a film retaining blade from the spool core. The slot is formed with a width that is determined precisely at least at the location at which the film end is secured to the spool core. Therefore, additional holding means, for example a cam, may be necessary when the walls of a film slot are formed by rigid portions. Thus, the film leader receiving slot may be associated with a cam engaging the perforations of the film to retain the film end. Alternatively, the film take-up spool may comprise a spool core that carries a clamping spring extending along the core axis for clamping the leading end of the film to the spool core. In the first case the insertion slot has a certain width for threading the film which then is secured to the film spool by the cam disposed in the slot, where as in the second case the leading end of the film is retained in the film spool by the resilience of the clamping spring. In this latter case, insertion of the leading end of the film into the slot beween the clamping spring and the spool core may be rendered more difficult if spring pressure is excessive, or a secure attachment of the film end to the spool may be questionable if the spring pressure is insufficient.

SUMMARY OF THE INVENTION

With respect to the present invention, however, I provide a convenient and secure attachment of the leading end of the film to the take-up spool of apparatus such as a quick loading camera without employing additional holding means. According to a preferred embodiment of the invention, the film spool comprises a multipart take-up spool incorporating several slots whose inlets are arranged on the surface of said film spool. The spool comprises a spool core and a clamping portion overlying the core with a plurality of clamping jaws that resiliently embrace said core to form the slots. The spool core and the clamping jaws portion have an interconnecting key and slot arrangement which has a compensating tolerance for limited lateral displacement of the clamping portion. By this arrangement, a quick and trouble free insertion of a film leader end with constant pressure of one of the clamping jaws on the inserted film end is made possible.

BRIEF DESCRIPTION OF THE DRAWINGS

The invention as well as objects and advantages thereof will become more apparent from the following description, the accompanying drawings forming a part thereof and wherein:

FIGURE 1 is a partial perspective view of a photographic camera embodying the present invention;

FIGURE 2 is a sectional view of the spool chamber in the photographic camera of FIGURE 1 with the camera back closed, the view being a side elevation along line 2—2 of FIGURE 1 and showing a preferred embodiment of a film take-up spol according to the invention; and FIGURE 3 is a cross sectional view of the film spool along line 3—3 of FIGURE 2.

DESCRIPTION OF THE PREFERRED EMBODIMENT

FIGURE 1 of the drawing partially shows a simplified loading photographic camera suitably embodying the present invention. The camera, more fully described in the above mentioned copending applications, comprises a case or body 1 having a back cover 5 pivotally mounted on one end thereof by means of a hinge 10. Accessible within the body 1 when the back 5 is open is a take-up spool 2 that is rotatably mounted adjacent hinge 10 within a film take-up cavity or chamber 1*a* of the case 1. Spool 2 is rotated (clockwise as viewed from the bottom of the camera) upon movement of a film advance or transport mechanism in a known manner. A second cavity (not shown) in the case 1 opposite the take-up spool 2 is adapted to receive a film supply means such as a cassette containing a preloaded roll of film 7.

The case 1 further includes a film gate 1*b* and defining an exposure aperture 1*c* over which the film 7 is transported from the film supply to the take-up spool 2 by operation of the film transport mechanism. Take-up spool 2 as shown is provided with a plurality (two) of open ended, axially extending slots 2*b* adjacent the open portion of case 1 to receive the leading end 7*a* of the film 7 by initially inserting film end 7*a* manually into the slot 2*b* as shown.

After loading of the film 7 in the camera and insertion of the film end 7*a* in the above manner, the camera back is closed. Movement of the back 5 to its closed position causes the film leading end 7*a*, if extending substantially beyond spool 2, to be engaged by the arcuate surfaces 5*c* and other surfaces of the cover 5 to position the end 7*a* over spool 2 in the cavity 1*a*. The film 7 then will be secured to the take-up spool 2 upon initial film advancement by actuation of film transport to locate the initial film frame at the exposure aperture 1*c*.

Referring now to FIGURES 2 and 3, the film spool 2 according to the present invention comprises a central spool core 2*c* and an overlying clamping jaw portion 3 in the spool chamber 1*a* of the camera housing 1. Spool core 2*c* is coupled, for example, by a polygon shaped key 4 with the film advance mechanism to rotate the spool 2 for frame by frame advancement between exposure operations. The take-up spool chamber 1*a* is shown in FIGURE 2 with the camera back 5 closed to seal the camera in a light tight manner.

At its bottom end surface opposite key 4, the spool core 2*c* is provided with a second polygon shaped key 2*a* functionally engaging the base of clamping jaw portion 3 by a recess or slot 3*a* in the jaw portion to rotate the jaw portion 3 with the core 2*c*. A pair of opposing, resilient jaws 3*b* formed on the clamping jaw portion 3 extend upwardly from the jaw portion base. Jaws 3*b* are biased to rest against opposing lateral surfaces 2*d* on spool core 2 that are recessed with respect to the overall spool diameter. The jaws 3*b* and surfaces 2*d* form between them the pair of film receiving slots 2*b* with open or film insertion inlets 8. To provide the functional connection between core 2*c* and jaw portion 3, there is provided a compensating tolerance or space 6 between the end surfaces 3*c* of recess 3*a* and the end walls of key 2*a*. Space 6 permits a displacement of the clamping jaw portion 3 laterally with respect to the surfaces 2*d* of the spool core 2*c* in the direction of the slot 2*b* in which the film end 7*a* is inserted. This lateral displacement is sufficient to permit a quick loading of the film end 7*a* in either slot 2*b* without adversely affecting the clamping of the jaws 3*b*. End surfaces 3*d* at the jaw portion base determine the limits of slots 2*b* and therefore the limit of axial insertion of film end 7*a*. Also, a marking such as arrow 3*e* may be provided to indicate the direction of film insertion.

The camera incorporating a quick loading film spool according to the invention is operated as follows:

A supply of film 7 is loaded into the camera when the camera back 5 is open. The leading end 7*a* of the film supply then is inserted in the direction of arrow 3*e* through the open ended inlet 8 of one of the slots 2*b* formed between the spool core 2*c* and the clamping jaws 3*b* until the bottom edge of the film abuts against the end surface 3*d*. In addition to the yielding of the clamping jaw 3*b*, the entire clamping jaw portion 3 may be displaced with respect to spool core 2*c* toward the spool side at which the film is inserted. The displacement in the area of space 6 permits a smooth, trouble-free loading and unloading of the film and, because of the bias of both clamping jaws 3*b*, a secure attachment of the film end 7*a* to the film spool 2 is assured. Further upon rewind of the film 7 back into the film supply chamber, the displacement permits the film end 7*a* to be removed more readily from the spool 2.

When the camera back 5 has been closed and the first frame of unexposed film has been advanced to the film gate 1*c* by the film advance mechanism, the camera then is ready for an exposure operation.

Accordingly, it now can be seen that a film take-up spool according to the present invention enables the quick and secure attachment of a film leader to the spool and eliminates transport trouble during the rewinding process. The invention has been described in detail with particular reference to a preferred embodiment thereof, but it will be understood that variations and modifications can be effected within the spirit and scope of the invention as described hereinabove and as defined in the appended claims.

I claim:

1. A film spool comprising:

(a) a core portion;

(b) a clamping jaw portion adjacent said core portion and including at least one jaw resiliently biased toward said core portion to define a film receiving slot between said jaw portion and said core portion;

(c) means formed by one of said portions and defining a recess; and (d) a key carried by the other of said portions and adapted to cooperate with said means for preventing relative rotational movement between said portions while permitting relative non-rotary displacement of said one portion relative to said other portion upon insertion of a film end in said slot.

2. A film spool according to claim 1 wherein said key slidably cooperates with said recess whereby said lateral displacement is permitted.

3. A film spool according to claim 1 further comprising indicia means on one of the portions indicating the direction in which the film end is inserted in the film receiving slot.

4. A film spool comprising: a core portion; a clamping jaw portion overlying the core portion, said jaw portion including at least two jaws in resilient engagement with opposite sides of said core portion to define a pair of film receiving slots between said jaws and said core portion; and means interconnecting said clamping jaw portion and said core portion for preventing relative rotation therebetween, said interconnecting means comprising a key on one of said portions, wall means defining a key receiving recess in the other of said portions, and a laterally displaceable connection for displacement of said clamping jaw portion relative to said core portion upon insertion of a film end in said slot between said jaws and said core portion, said displaceable connection defining a space-between said key and said wall means for providing for lateral movement of said core portion along a line between the opposing jaws.

References Cited

UNITED STATES PATENTS

| | | | |
|---|---|---|---|
| 2,373,704 | 4/1945 | Obolensky | 242—74.1 |
| 2,766,948 | 10/1956 | Mundt et al. | 242—74.1 |

NATHAN L. MINTZ, Primary Examiner